United States Patent [19]
Ohkubo

[11] Patent Number: 5,619,427
[45] Date of Patent: Apr. 8, 1997

[54] COLOR CONVERSION METHOD AND COLOR CONVERSION TABLE GENERATING APPARATUS

[75] Inventor: Akito Ohkubo, Kanagawa-ken, Japan

[73] Assignee: Fuji Photo Film Co., Ltd., Kanagawa, Japan

[21] Appl. No.: 655,235

[22] Filed: Jun. 5, 1996

[30] Foreign Application Priority Data

Jun. 22, 1995 [JP] Japan .................................. 7-156555

[51] Int. Cl.⁶ .................................. G01J 3/46; G03F 3/08
[52] U.S. Cl. .......................... 364/526; 358/518; 358/523
[58] Field of Search ........................... 364/526; 358/518, 358/523, 525, 527, 529

[56] References Cited

FOREIGN PATENT DOCUMENTS 318179   1/1991   Japan ................................ H04N 1/46

OTHER PUBLICATIONS

Photographic Science and Engineering, vol. 16, pp. 136–143, "Metameric Color Matching in Subtractive Color Photography".

*Primary Examiner*—Emanuel T. Voeltz
*Assistant Examiner*—Demetra R. Smith
*Attorney, Agent, or Firm*—Sughrue, Mion, Zinn Macpeak & Seas

[57] ABSTRACT

A plurality of color patches whose colors differ stepwise are colorimetrically analyzed to determining a relationship between color signals and stimulus signals. A method of least squares is applied to the determined relationship to determine a relationship between first hypothetical color signals and first hypothetical stimulus signals. These relationships are established as a forward conversion table. Then, a first reverse conversion table is generated from the forward conversion table using the Newton's method. The relationship between the first hypothetical color signals and the first hypothetical stimulus signals in the first reverse conversion table is replaced with a relationship between second hypothetical color signals and second hypothetical stimulus signals which have a physically matching capability, thus generating a second reverse conversion table from the first reverse conversion table. The second reverse conversion table is mapped to produce a reverse conversion table which is used to convert stimulus signals into color signals.

9 Claims, 8 Drawing Sheets

COLOR CONVERSION METHOD AND COLOR CONVERSION TABLE GENERATING APPARATUS

BACKGROUND OF THE INVENTION

1. Field of the Invention

The present invention relates to a color conversion method and a color conversion table generating apparatus for converting a color signal from a first colorimetric system to a second colorimetric system.

2. Description of the Related Art

For recording color images with an image output apparatus such as a color printer or the like, it is possible to realize color images having desired colors by manipulating color signals of colors C (cyan), M (magenta), Y (yellow). Since the color signals depend upon the output characteristics of the image output apparatus, any color signals supplied from an external apparatus having different characteristics need to be converted by a color conversion process raking the output characteristics into account.

According to one conventional method, a plurality of known color patches in different colors are generated using the image output apparatus. The color patches are colorimetrically analyzed to produce a conversion relationship (hereinafter referred to as a "forward conversion relationship") for converting known color signals CMY of the color patches into stimulus signals XYZ. Then, a conversion relationship (hereinafter referred to as a "reverse conversion relationship") for converting the stimulus signals XYZ back into color signals CMY is determined. The above color conversion process is carried out using the reverse conversion relationship.

FIG. 9 of the accompanying drawings shows a two-dimensional representation of the forward and reverse conversion relationships between known color signals CMY of color patches generated at regular grid intervals and stimulus signals XYZ. The color signals CMY at respective grid points in a CMY colorimetric system correspond to the stimulus signals XYZ at respective grid points in an XYZ colorimetric system. Since grid intervals are highly irregular in the XYZ colorimetric system, when color signals CMY corresponding to stimulus signals XYZ at a point A are to be determined, interpolating calculations tend to be effected using color signals CMY at points A3, A4, A5, A6 near the point A while in fact interpolating calculations should be effected using color signals CMY at points A1, A2, A3, A4. It is therefore highly difficult to determine grid points surrounding any optional stimulus signals XYZ for a reverse conversion process.

There has been known a process of determining color signals CMY from stimulus signals XYZ by setting up a tetrahedron whose vertexes are provided by stimulus signals XYZ of four points, dividing a space of the stimulus signals XYZ with the tetrahedron, similarly dividing a space of color signals CMY with a tetrahedron, and determining color signals CMY with respect to any optional stimulus signals XYZ in the corresponding tetrahedron according to linear calculations (see Japanese laid-open patent publication No. 3-18179). According to another process, color signals CMY corresponding to any optional stimulus signals XYZ are determined according to repetitive calculations using the Newton's method (see PHOTOGRAPHIC SCIENCE AND ENGINEERING, Volume 16, Number 2, March–April 1972, pp. 136–143 "Metameric color matching in subtractive color photography").

According to the former process, however, as the space of the stimulus signals XYZ is more and more distorted, the risk of an inappropriate choice of the stimulus signals XYZ of four points making up the tetrahedron becomes larger, making it more difficult to search for corresponding color signals CMY with precision.

According to the latter process, since the forward conversion relationship obtained from the color patches has a limited range, there may possibly be occasions where it is impossible to continue the repetitive calculations while in progress. One solution would be to insert a damping coefficient to keep calculated values produced by the repetitive calculations within the limited range. However, the damping coefficient would have to be established on a trial-and-error basis, and the calculations may possibly fail to converge in the vicinity of the boundaries of the range. Establishing hypothetical stimulus signals XYZ and color signals CMY outside the range may make it possible to sustain the calculations, but accurate color signals CMY may not be obtained depending on the manner in which those hypothetical stimulus signals XYZ and color signals CMY are established.

SUMMARY OF THE INVENTION

It is a general object of the present invention to provide a color conversion method and a color conversion table generating apparatus for converting a color signal from a first colorimetric system to a second colorimetric system highly accurately using a forward conversion relationship for conversion from the second colorimetric system to the first colorimetric system.

A major object of the present invention is to provide a color conversion method and a color conversion table generating apparatus for reliably determining a reverse conversion relationship for conversion from a first colorimetric system to a second colorimetric system using repetitive calculations.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
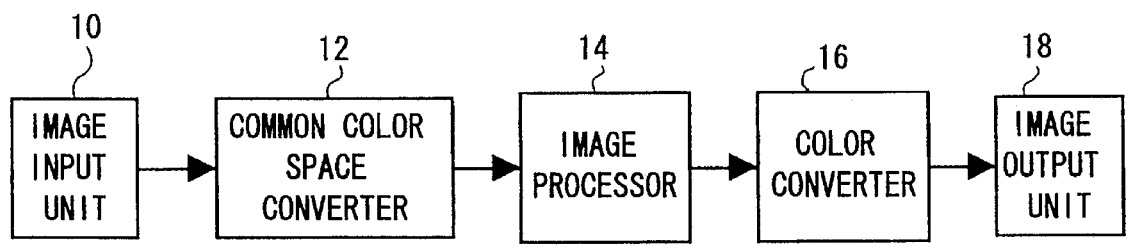
FIG. 1 is a block diagram of an image output apparatus which incorporates a reverse conversion table generated by a color conversion method according to the present invention.

FIG. 1 shows in block form an image output apparatus which incorporates a reverse conversion table (reverse conversion relationship) generated by a color conversion method according to the present invention. The image output apparatus is an apparatus for recording color images in combinations of colors C (cyan), M (magenta), Y (yellow).

As shown in FIG. 1, the image output apparatus comprises an image input unit 10 for reading a color original to generate color signals or receiving color signals supplied from an external apparatus, a common color space converter 12 for converting the color signals from the image input unit 10 into stimulus signals XYZ which are color signals in a common color space that does not depend upon the output characteristics of the image output apparatus, an image processor 14 for processing the stimulus signals XYZ, a color converter 16 for converting the processed stimulus signals XYZ into color signals CMY inherent in the image output apparatus using a reverse conversion table generated by a conversion table generating apparatus (described later on), and an image output unit 18 for outputting an image based on the color signals CMY.

In the illustrated embodiment, the principles of the present invention will be described with respect to conversion between the color signals CMY and the stimulus signals XYZ. However, the principles of the present invention are also applicable to conversion between an L*a*b* colorimetric system, an L*u*v* colorimetric system, an RGB colorimetric system, etc.

Figure 2:
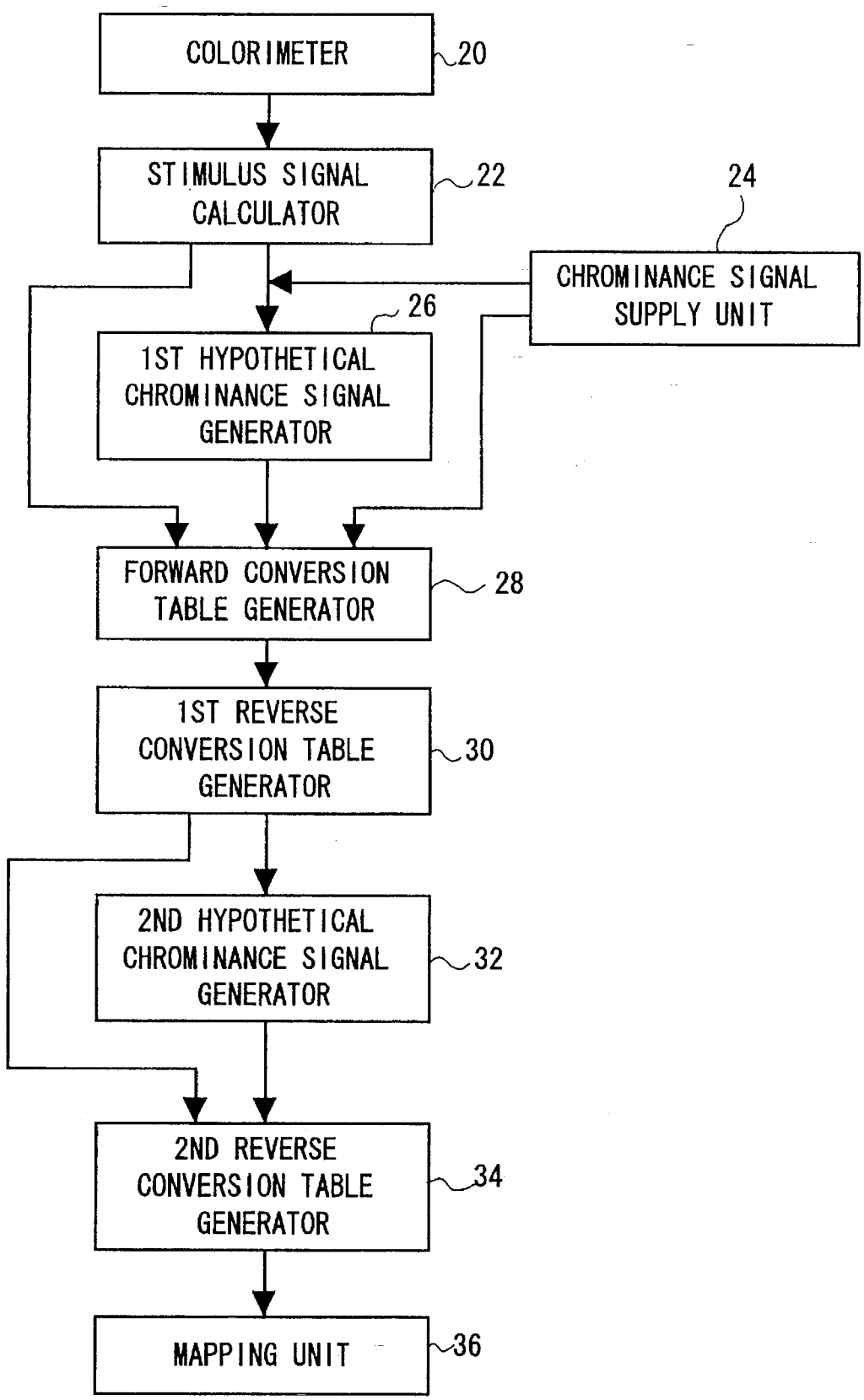
FIG. 2 is a block diagram of a color conversion table generating apparatus according to the present invention.

FIG. 2 shows in block form a color conversion table generating apparatus according to the present invention. As shown in FIG. 2, the conversion table generating apparatus comprises a colorimeter 20, a stimulus signal calculator 22, a color signal supply unit 24, a first hypothetical color signal generator 26, a forward conversion table generator 28, a first reverse conversion table generator 30, a second hypothetical color signal generator 32, a second reverse conversion table generator 34, and a mapping unit 36.

The colorimeter 20 measures spectral distributions of lights reflected from color patches which have been generated using the image output apparatus shown in FIG. 1. The stimulus signal calculator 22 calculates stimulus signals XYZ from the measured spectral distributions of reflected lights and a spectral distribution of a given observation light source. The color signal supply unit 24 supplies color signals CMY for generating the color patches to the first hypothetical color signal generator 26 and the forward conversion table generator 28. The first hypothetical color signal generator 26 establishes first hypothetical color signals CMY1* and corresponding first hypothetical stimulus signals XYZ1* in a sufficiently wide region outside a region made up of the color signals CMY and the stimulus signals XYZ, using a method of least squares based on the stimulus signals XYZ from the stimulus signal calculator 22. The forward conversion table generator 28 generates a forward conversion table for producing stimulus signals XYZ including the first hypothetical stimulus signals XYZ1* from color signals CMY including the first hypothetical color signals CMY1*, based on the color signals CMY from the color signal supply unit 24 and the stimulus signals XYZ from the stimulus signal calculator 22 (these signals will hereinafter be referred to as "actual color signals") and also based on the first hypothetical stimulus signals XYZ1* from the first hypothetical color signal generator 26. The first reverse conversion table generator 30 generates a first reverse conversion table for producing color signals CMY including the first hypothetical color signals CMY1* from stimulus signals XYZ including the first hypothetical stimulus signals XYZ1*, using the Newton's method which is a repetitive calculation process, according to the forward conversion table. The second hypothetical color signal generator 32 establishes second hypothetical color signals CMY2* and corresponding second hypothetical stimulus signals XYZ2* in a sufficiently wide region outside the region made up of the color signals CMY and the stimulus signals XYZ, using a new first reverse conversion table which is similar to the above first reverse conversion table except that the relationship between the first hypothetical color signals CMY1* and the first hypothetical stimulus signals XYZ1* is removed therefrom. The second reverse conversion table generator 34 generates a second reverse conversion table for producing color signals CMY including the second hypothetical color signals CMY2* from stimulus signals XYZ including the second hypothetical stimulus signals XYZ2*. The mapping unit 36 maps the second reverse conversion table onto a reverse conversion table in the range of an inherent color space which can be expressed by the image output apparatus shown in FIG. 1.

Figure 3:
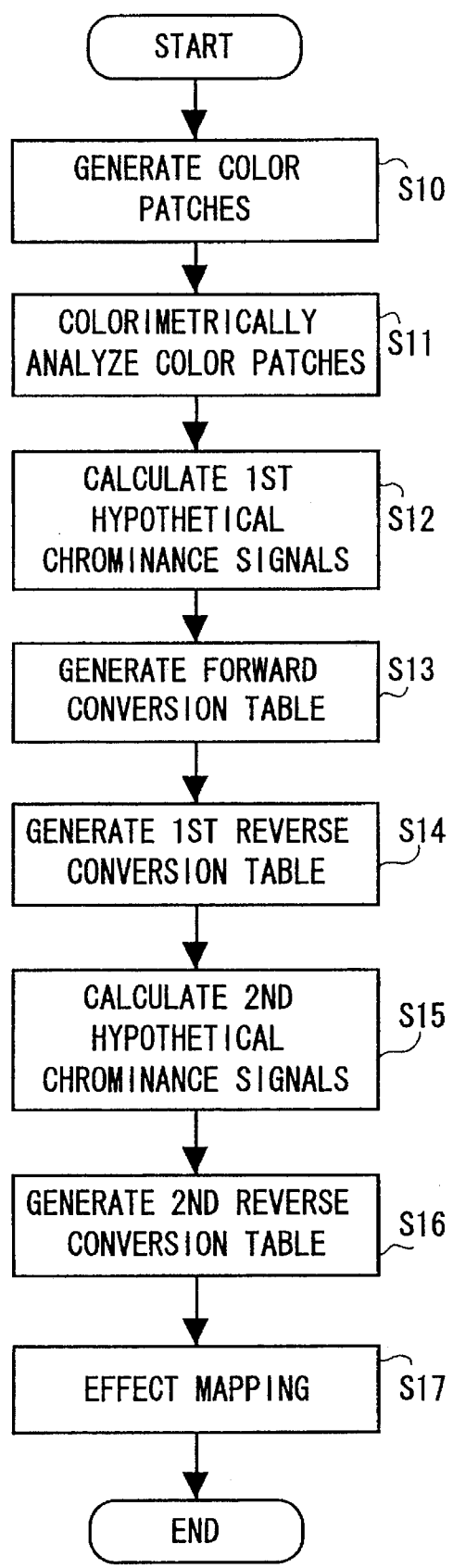
FIG. 3 is a flowchart of a process of generating a reverse conversion table.

A process of generating a reverse conversion table using the image output apparatus shown in FIG. 1 and the color conversion table generating apparatus shown in FIG. 2 will be described below with reference to FIG. 3.

A plurality of color signals CMY at regular intervals are supplied to the image output unit 18 shown in FIG. 1 for thereby generating color patches which have different densities and mixed ratios of C, M, Y that vary stepwise, in a step S10. Then, the color patches are colorimetrically analyzed using the color conversion table generating apparatus shown in FIG. 2 in a step S11.

Specifically, the colorimeter 20 measures spectral distributions of the color patches, and the stimulus signal calculator 22 calculates stimulus signals XYZ from the measured spectral distributions and a spectral distribution of a given observation light source. If it is assumed that visible light has a wavelength range from 380 nm to 780 nm, then the stimulus signals XYZ can be expressed by the following equations:

$$X = K \int_{380}^{780} S(\lambda)\rho(\lambda)x(\lambda)d\lambda \tag{1}$$

$$Y = K \int_{380}^{780} S(\lambda)\rho(\lambda)y(\lambda)d\lambda \tag{2}$$

$$Z = K \int_{380}^{780} S(\lambda)\rho(\lambda)z(\lambda)d\lambda \tag{3}$$

where $S(\lambda)$ represents the spectral distribution of the observation light source ($\lambda$ is the wavelength of light), $\rho(\lambda)$ represents the distribution of spectral reflectances of an object, $x(\lambda)$, $y(\lambda)$, $z(\lambda)$ represent the color matching functions with respect to human eyes, and K is a standardizing coefficient that is given as follows:

$$K = 100 / \int_{380}^{780} S(\lambda) y(\lambda) d\lambda \qquad (4)$$

Figure 4:
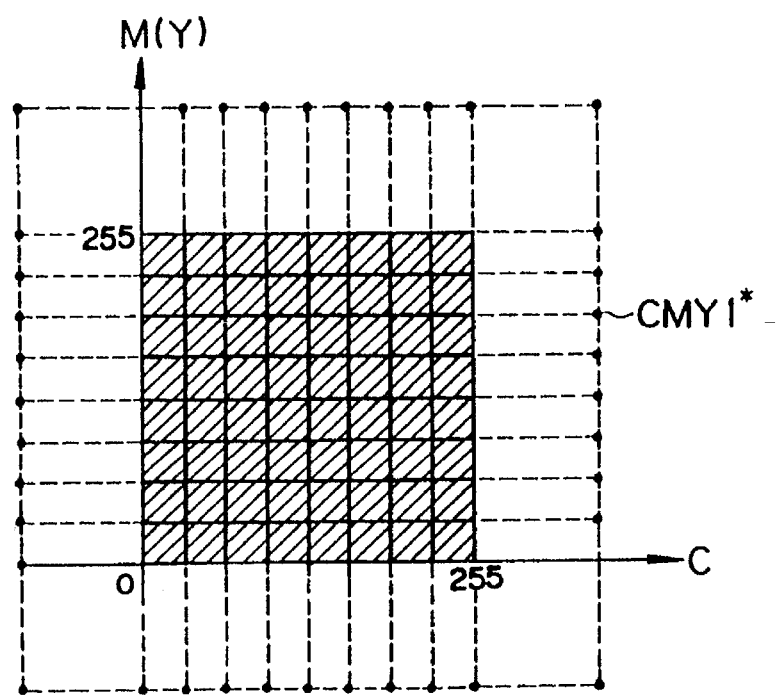
FIG. 4 is a diagram illustrative of color signals CMY including hypothetical color signals.

When minimum and maximum densities of the color patch of each of the colors C, M, Y are standardized to 0 and 255, and divided into 8 stages and outputted, it is possible to produce 512 (=8×8×8) color patches shown in FIG. 4. It is now possible to obtain a first forward conversion table which represents the relationship of stimulus signals XYZ with respect to the color signals CMY of each of the color patches.

Thereafter, first hypothetical color signals CMY1* are established at a sufficiently spaced position outside a color reproducing region (shown hatched in FIG. 4) made up of the color patches, and first hypothetical stimulus signals XYZ1* corresponding to the first hypothetical color signals CMY1* are determined in a step S12.

The first hypothetical color signal generator 26 determines the first hypothetical stimulus signals XYZ1* using the method of least squares, on the assumption that the relationship between the stimulus signals XYZ from the stimulus signal calculator 22 and the color signals CMY, corresponding to the stimulus signals XYZ, from the color signal supply unit 24 is monotonous. The above assumption is assured based on the fact that as the color signals CMY increase, the intensity of lights reflected from the color patches decreases, resulting in a monotonous reduction of the stimulus signals XYZ obtained according to the equations (1)~(3).

Using all data sets (Ci, Mi, Yi, Xi, Yi, Zi) (i represents the number of a color patch) of the color signals CMY and the stimulus signals XYZ which are produced from the color patches, four-dimensional planes of X-CMY, Y-CMY, Z-CMY are determined using the method of least squares. The four-dimensional planes of X-CMY, Y-CMY, Z-CMY are defined as follows:

$$T = A \cdot D \qquad (5)$$

The equation (5) represents the relationship given by the following equation (6):

$$\begin{bmatrix} X \\ Y \\ Z \end{bmatrix} = \begin{bmatrix} A_{X1} & A_{X2} & A_{X3} & A_{X4} \\ A_{Y1} & A_{Y2} & A_{Y3} & A_{Y4} \\ A_{Z1} & A_{Z2} & A_{Z3} & A_{Z4} \end{bmatrix} \begin{bmatrix} C \\ M \\ Y \\ 1 \end{bmatrix} \qquad (6)$$

A coefficient A which satisfies the relationship of the equation (5) is determined using the method of least squares in order to minimize E expressed according to the following equation (7):

$$E = \sum_i (T_i - A \cdot D_i) \cdot (T_i - A \cdot D_i)^T \qquad (7)$$

where i represent the number of a patch and the superscript T represents a transposition for switching around columns and rows in a matrix.

When the coefficient A is determined according to the equation (7), each of the four-dimensional planes of X-CMY, Y-CMY, Z-CMY is determined. On the four-dimensional planes of X-CMY, Y-CMY, Z-CMY thus determined, there are then determined first hypothetical color signals CMY1* positioned sufficiently remote from the color signals CMY of the color patches and first hypothetical stimulus signals XYZ1* corresponding thereto.

Figure 5:
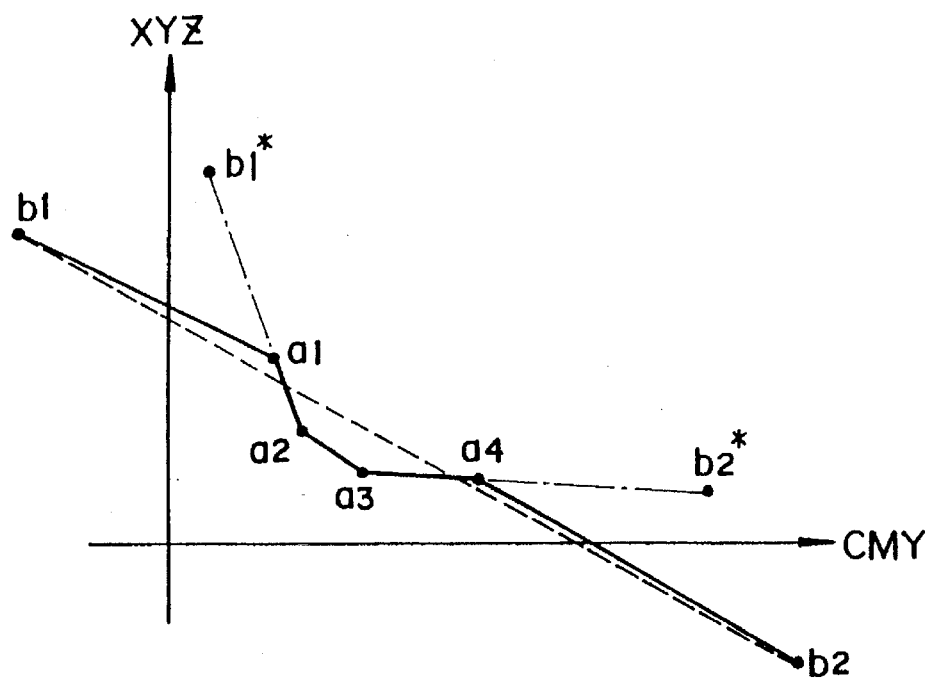
FIG. 5 is a diagram illustrative of the manner in which hypothetical color signals are generated according to a method of least squares.

FIG. 5 schematically shows a two-dimensional representation of the relationship between the color signals CMY and the first hypothetical color signals CMY1*, and the stimulus signals XYZ and the first hypothetical stimulus signals XYZ1* generated as described above. Specifically, as can be understood from the above finding, the relationship between the color signals CMY produced from the color patches and the stimulus signals XYZ monotonously decreases as indicated by points a1~a4. If a four-dimensional plane calculated according to the method of least squares using the points a1~a4 is indicated by the dotted line, then a plane which interconnects points b1, b2 indicating the first hypothetical stimulus signals XYZ1* corresponding to the first hypothetical color signals CMY1* on the four-dimensional plane and the points a1~a4 monotonously decreases as indicated by the solid line. Therefore, when the first hypothetical stimulus signals XYZ1* corresponding to the first hypothetical color signals CMY1* are generated according to the method of least squares, it is possible to keep a monotonous relationship between the color signals CMY including the first hypothetical color signals CMY1* and the stimulus signals XYZ including first hypothetical stimulus signals XYZ1*.

After the first hypothetical stimulus signals XYZ1* with respect to the first hypothetical color signals CMY1* have been determined, the forward conversion table generator 28 generates a second forward conversion table for converting the color signals CMY including the first hypothetical color signals CMY1* into the stimulus signals XYZ including first hypothetical stimulus signals XYZ1*, in a step S13.

Then, the first reverse conversion table generator 30 generates a first reverse conversion table for converting the stimulus signals XYZ including first hypothetical stimulus signals XYZ1* into the color signals CMY including the first hypothetical color signals CMY1* according to the Newton's method using the second forward conversion table, in a step S14.

Figure 9:
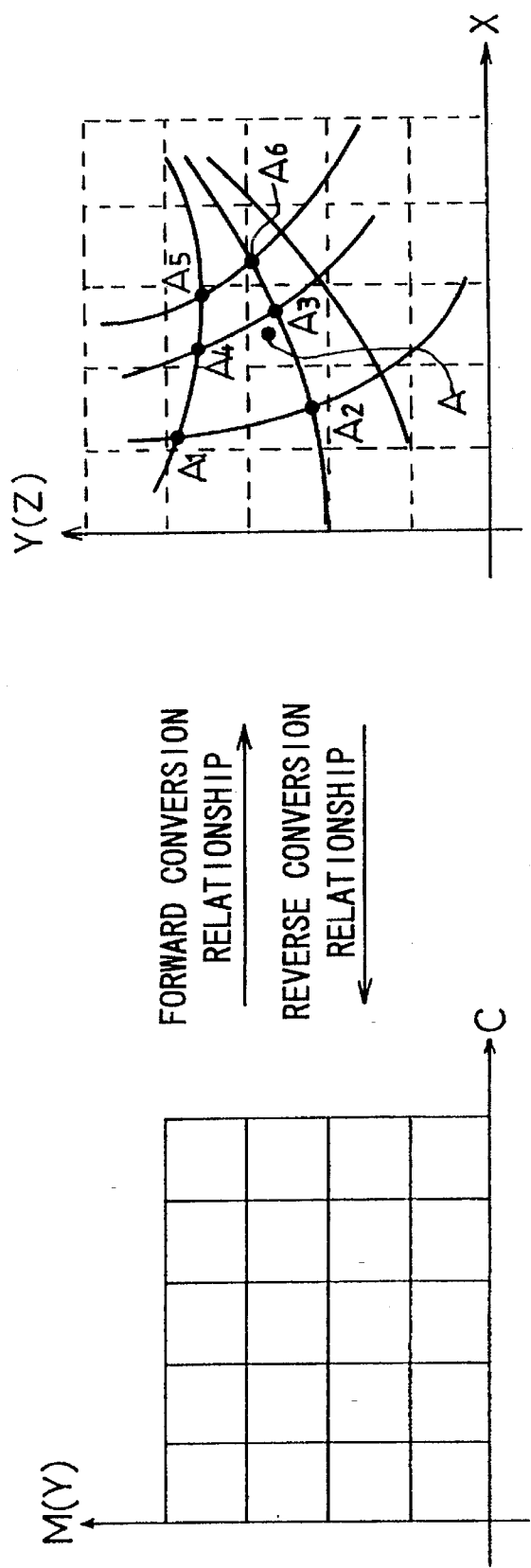
FIG. 9 is a diagram illustrative of conversion relationships between a CMY color space and an XYZ color space.

Since a CMY color space is made up of the color signals CMY including the first hypothetical color signals CMY1* arranged in a grid pattern as shown in FIG. 4, it is possible to determine stimulus signals XYZ corresponding to any optional color signals CMY according to interpolation using the second forward conversion table. However, because an XYZ color space obtained from the CMY color space is distorted as shown in FIG. 9, it is difficult to determine color signals CMY corresponding to any optional stimulus signals XYZ. Therefore, stimulus signals XYZ arranged at regular intervals as indicated by the dotted lines in FIG. 9 are established in the XYZ color space, and color signals CMY corresponding to the stimulus signals XYZ are calculated according to the Newton's method thereby to determine the first reverse conversion table.

Figure 6:
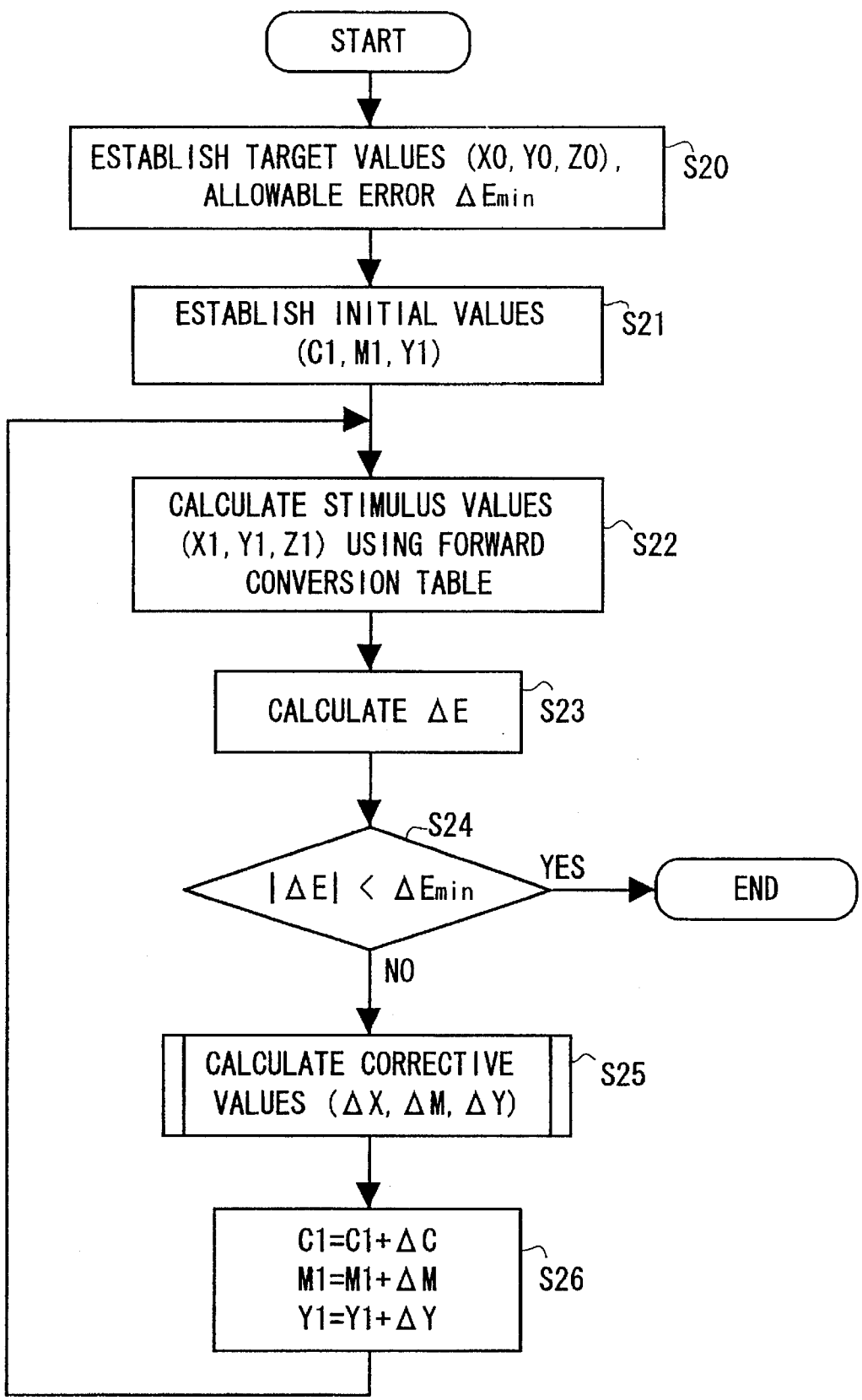
FIG. 6 is a flowchart of a process of calculating color signals according to the Newton's method.

FIG. 6 shows a subroutine of a processing sequence for determining the first reverse conversion table. As shown in FIG. 6, target values on the grid of the XYZ color space are set to (X0, Y0, Z0), and an allowable error or tolerance in repetitive calculations is set to $\Delta E_{min}$ in a step S20. Then, known initial values (C1, M1, Y1) in the CMY color space are established in a step S21, and stimulus values (X1, Y1, Z1) corresponding to the initial values (C1, M1, Y1) are determined in a step S22. Then, an error or difference $\Delta E$ between the target values (X0, Y0, Z0) and the stimulus values (X1, Y1, Z1) is determined in a step S23, after which the error $\Delta E$ is compared with the allowable error $\Delta E_{min}$ in a step S24. The allowable error $\Delta E_{min}$ may be established as a color difference calculated according to color difference equations in an Lab colorimetric system, for example. If $|\Delta E|$ is not smaller than $\Delta E_{min}$, then corrective values ($\Delta C$, $\Delta M$, $\Delta Y$) are calculated in a step S25, and then the initial values (C1, M1, Y1) are corrected by the respective corrective values (ΔC, ΔM, ΔY) in a step S26. Thereafter, the steps S22–S24 are repeated.

Figure 7:
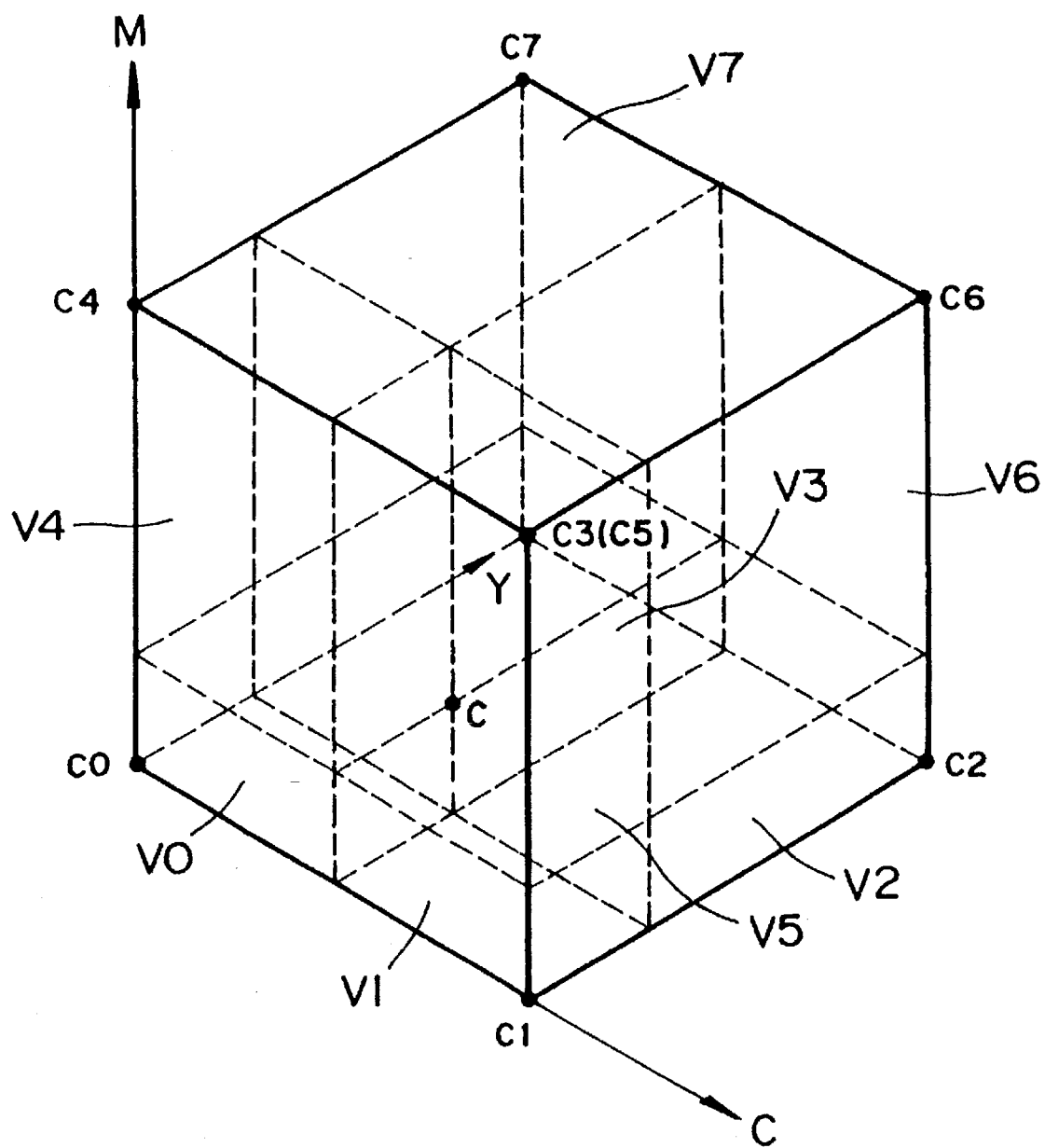
FIG. 7 is a diagram illustrative of volume interpolation.

The corrective values (ΔC, ΔM, ΔY) are calculated as follows: When any optional color signals CMY are given, stimulus signals XYZ corresponding to the color signals CMY (indicated at an interpolation point c in FIG. 7) can be determined using stimulus signals (x0, y0, z0)–(x7, y7, z7) corresponding to color signals (c0, m0, y0)–(c7, m7, y7) at eight grid points c0–c7, the volume V of a rectangular parallelepiped surrounded by the grid points c0–c7, and eight volumes V0–V7 divided by any optional interpolation point c in the rectangular parallelepiped, according to the following equations (8)–(10):

$$X = \sum_{j=0}^{7} V_j \cdot X_j / V \qquad (8)$$

$$Y = \sum_{j=0}^{7} V_j \cdot Y_j / V \qquad (9)$$

$$Z = \sum_{j=0}^{7} V_j \cdot Z_j / V \qquad (10)$$

If it is assumed that the stimulus signals XYZ corresponding to the color signals CMY in the equations (8)–(10) are linear in a small range, then the corrective values (ΔC, ΔM, ΔY) which represent small changes in the color signals CMY and small changes (ΔX, ΔY, ΔZ) in the stimulus signals XYZ satisfy the following equation:

$$\begin{bmatrix} \Delta X \\ \Delta Y \\ \Delta Z \end{bmatrix} = \begin{bmatrix} \frac{\partial X}{\partial Dc} & \frac{\partial X}{\partial Dm} & \frac{\partial X}{\partial Dy} \\ \frac{\partial Y}{\partial Dc} & \frac{\partial Y}{\partial Dm} & \frac{\partial Y}{\partial Dy} \\ \frac{\partial Z}{\partial Dc} & \frac{\partial Z}{\partial Dm} & \frac{\partial Z}{\partial Dy} \end{bmatrix} \begin{bmatrix} \Delta C \\ \Delta M \\ \Delta Y \end{bmatrix} = J \begin{bmatrix} \Delta C \\ \Delta M \\ \Delta Y \end{bmatrix} \qquad (11)$$

where J represents a Jacobian matrix, and Dc, Dm, Dy represent C, M, Y, respectively. The reference characters Dc, Dm, Dy are used in order to avoid confusion between Y in the colors XYZ and Y in the colors CMY. When the Jacobian matrix J is determined in the equation (11), small changes (ΔX, ΔY, ΔZ) in the stimulus signals XYZ corresponding to the corrective values (ΔC, ΔM, ΔY) for the color signals CMY can be predicted. The Jacobian matrix J can be determined by partially differentiating the equations (8)–(10) with the color signals CMY.

Therefore, the corrective values (ΔC, ΔM, ΔY) for the color signals CMY are determined as:

$$\begin{bmatrix} \Delta C \\ \Delta M \\ \Delta Y \end{bmatrix} = J^{-1} \begin{bmatrix} \Delta X \\ \Delta Y \\ \Delta Z \end{bmatrix} \qquad (12)$$

By carrying out repetitive calculations using the Jacobian matrix J, it is possible to determine color signals CMY with respect to optional target values (X0, Y0, Z). The same processing is effected with respect to all target values on the grid in the XYZ color space, thus generating the first reverse conversion table for converting stimulus signals XYZ into color signals CMY in a step S14.

According the Newton's method, it is necessary that an equation having a solution to be determined be a monotonous function as a condition for convergence. There is a monotonous relationship between the color signals CMY including the first hypothetical color signals CMY1* and the stimulus signals XYZ including the first hypothetical stimulus signals XYZ1*, and the CMY and XYZ color spaces are expanded into regions of hypothetical color signals, with all color signals CMY and stimulus signals XYZ being present which are calculated in the repetitive calculations. Therefore, the repetitive calculations can be carried out reliably without divergence, for thereby obtaining accurate values.

Figure 8:
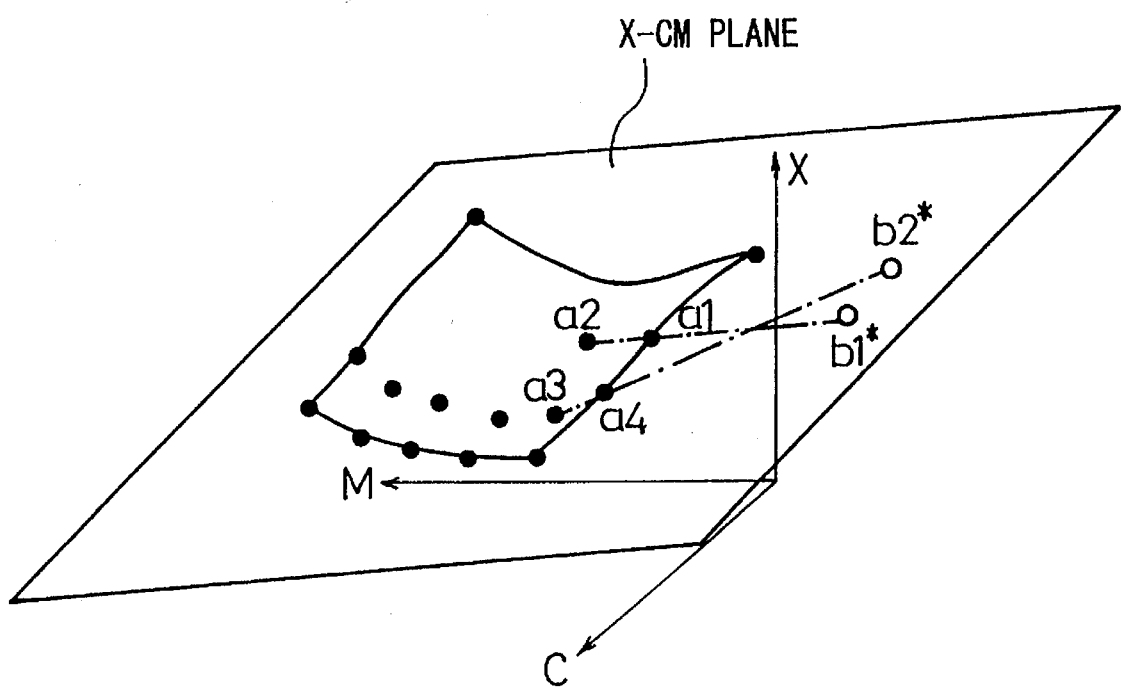
FIG. 8 is a diagram illustrative of color signals and hypothetical color signals expressed in an X-CM color space.

The first reverse conversion table generated in the manner described above includes a relationship derived from the first hypothetical color signals CMY1* and the first hypothetical stimulus signals XYZ1*. Since these signals are established using the method of least squares as shown in FIG. 5 for reliably obtaining solutions according to the Newton's method, these signals are different from actual physical characteristics. Hypothetical color signals taking actual physical characteristics into account should be established as points b1*, b2* to be smoothly joined to the points a1–a4 as indicated by the dot-and-dash lines in FIG. 5. However, as shown in FIG. 8, if the points b1*, b2* are represented in an X-CM color space, then the processing according to the Newton's method cannot apply because they may not maintain a monotonous relationship.

To avoid such a drawback, after the Newton's method has been carried out using the data of points b1, b2, the second hypothetical color signal generator 32 determines second hypothetical color signals CMY2* and second hypothetical stimulus signals XYZ2* at the point b1* according to the method of least squares using only the points a1, a2 near the point b1*, and also determines second hypothetical color signals CMY2* and second hypothetical stimulus signals XYZ2* at the point b1* according to the method of least squares using only the points a3, a4 near the point b2*, in order to achieve the relationship indicated by the dot-and-dash lines, in a step S15. Then, the second reverse conversion table generator 34 replaces the first hypothetical color signals CMY1* and the first hypothetical stimulus signals XYZ1* with the second hypothetical color signals CMY2* and the second hypothetical stimulus signals XYZ2*, and establishes the relationship between the color signals CMY including the second hypothetical color signals CMY2* and the stimulus signals XYZ including second hypothetical stimulus signals XYZ2* as a second reverse conversion table in a step S16.

Finally, the mapping unit 36 maps the second reverse conversion table onto a range capable of reproducing the color signals CMY in the image output apparatus according to the Gamut mapping process for thereby producing a desired reverse conversion table which can convert stimulus signals XYZ into color signals CMY in a step S17.

The reverse conversion table thus generated is set in the color converter 16 of the image output apparatus shown in FIG. 1. In the image output apparatus, an image signal read by the image input unit 10 is converted into stimulus signals XYZ by the common color space converter 12, and then the stimulus signals XYZ are processed by the image processor 14. Thereafter, the color converter 16 converts the processed stimulus signals XYZ into color signals CMY according to the reverse conversion table by way of volume interpolation, and effects mapping on the color signals CMY. The color signals CMY are then outputted as a visible image by the image output unit 18.

In the reverse conversion table, there are established stimulus signals XYZ corresponding to color signals CMY in a range wider than the CMY color space that can be reproduced by the image output apparatus, as second hypothetical stimulus signals XYZ2*. Therefore, even if the stimulus signals XYZ are positioned in the vicinity of boundaries of the region that can be reproduced by the image output apparatus, the color signals CMY can be determined highly accurately by way of volume interpolation using the second hypothetical stimulus signals XYZ2*.

In the reverse conversion table, the stimulus signals XYZ are converted into color signals CMY and mapped simultaneously. Consequently, the desired color signals CMY can be obtained at high speed. If the stimulus signals XYZ are converted into color signals CMY after being mapped, then the accuracy of the conversion process can be increased because the accuracy of the stimulus signals XYZ with respect to the color signals CMY can be maintained. If the stimulus signals XYZ are converted into color signals CMY and thereafter mapped, then the accuracy of the conversion process in the vicinity of boundaries of the color-reproducible region is made higher than with the illustrated embodiment, and the mapping process is facilitated.

In the above embodiment, the method of least squares has been used as an approximation method according to a monotonous function. However, a multiple regression analysis or a method of weighted least squares may be used as such an approximation method. Furthermore, a method of steepest descent or a quasi-Newton's method, rather than the Newton's method, may be used as the method of repetitive calculations.

In FIG. 1, the conversion table established in the common color space converter 12 and the reverse conversion table established in the color converter 16 may be combined with each other for converting an image signal supplied from the image input unit 10 directly into color signals, without being first converted into stimulus signals.

In the illustrated embodiment, the color patches which have different densities of C, M, Y that vary stepwise are generated and colorimetrically analyzed to determine a reverse conversion table in the steps S10, S11. However, if patches in the vicinity of a certain color such as gray, a flesh color, or the like are generated in finer dimensions than the other patches, then the accuracy of a reverse conversion table with respect to such a certain color may be increased.

According to the present invention, as described above, the relationship between the first and second colorimetric systems is approximated by a monotonous function to establish hypothetical color signals outside a region made up of known actual color signals of the second colorimetric system, a forward conversion relationship including the hypothetical color signals is determined, and then a reverse conversion relationship for converting color signals from the first colorimetric system to the second colorimetric system is determined from the forward conversion relationship using repetitive calculations. Inasmuch as the reverse conversion relationship includes the relationship of the hypothetical color signals outside the region made up of the known actual color signals, calculated values can reliably be determined by the repetitive calculations, and thus a highly accurate color conversion process can be carried out. Although a certain preferred embodiment of the present invention has been shown and described in detail, it should be understood that various changes and modifications may be made therein without departing from the scope of the appended claims.

What is claimed is:

1. A method of converting color signals from a first colorimetric system to a second colorimetric system, comprising the steps of:

(a) determining a relationship of actual color signals of the first colorimetric system obtained from known actual color signals of the second colorimetric system, as a first forward conversion relationship;

(b) approximating said first forward conversion relationship with a monotonous function to establish hypothetical color signals outside a region made up of said actual color signals;

(c) determining a relationship of color signals of the first colorimetric system obtained from color signals which comprise said actual color signals and said hypothetical color signals of the second colorimetric system, as a second forward conversion relationship;

(d) determining a relationship of the color signals of the second colorimetric system obtained from the color signals of the first colorimetric system, as a reverse conversion relationship from said second forward conversion relationship using a method of repetitive calculations; and (e) converting the color signals from the first colorimetric system to the second colorimetric system using said reverse conversion relationship.

2. A method according to claim 1, wherein said step (a) comprises the steps of colorimetrically analyzing color patches generated based on the known actual color signals of the second colorimetric system, and determining said first forward conversion relationship as a relationship between colorimetrically analyzed values and said actual color signals.

3. A method according to claim 1, wherein said step (b) comprises the step of establishing the hypothetical color signals according to a method of least squares.

4. A method according to claim 1, wherein said method of repetitive calculations comprises a Newton's method.

5. A method according to claim 1, further comprising the steps of:

replacing the hypothetical color signals which make up the reverse conversion relationship with new hypothetical color signals calculated according to the method of least squares, using the actual color signals close to said hypothetical color signals, for thereby producing a new reverse conversion relationship between said actual color signals and said new hypothetical color signals.

6. A method according to claim 5, further comprising the step of mapping said hypothetical color signals making up said new reverse conversion relationship onto a color-reproducible range of an image output apparatus, for thereby producing a reverse conversion relationship made up of the actual color signals.

7. A color conversion table generating apparatus for use in an image output apparatus for converting color signals from a first colorimetric system to a second colorimetric system and outputting a color image based on color signals of the second colorimetric system, comprising:

a colorimeter for colorimetrically analyzing color patches which are outputted from the image output apparatus based on the color signals of the second colorimetric system;

hypothetical signal generating means for generating, from the color signals and colorimetrically analyzed values of the color patches, hypothetical color signals and hypothetical colorimetrically analyzed values capable of maintaining a monotonous relationship between the color signals and the colorimetrically analyzed values;

forward conversion table generating means for determining a relationship between said color signals and said hypothetical color signals, and said colorimetrically analyzed values and said hypothetical colorimetrically analyzed values, as a forward conversion table; and reverse conversion table generating means for generating a reverse conversion table corresponding to said forward conversion table according to a method of repetitive calculations.

8. A color conversion table generating apparatus according to claim 7, further comprising second reverse conversion table generating means for replacing the hypothetical color signals and the hypothetical colorimetrically analyzed values which make up the reverse conversion relationship generated by said reverse conversion table generating means, with new hypothetical color signals and hypothetical colorimetrically analyzed values which are calculated according to a method of least squares for thereby generating a new reverse conversion table.

9. A color conversion table generating apparatus according to claim 8, further comprising mapping means for mapping said hypothetical color signals and said hypothetical colorimetrically analyzed values which make up said new reverse conversion table onto a color-reproducible range of said image output apparatus.

* * * * *